United States Patent [19]

Canat et al.

[11] Patent Number: 5,183,629
[45] Date of Patent: Feb. 2, 1993

[54] ADDITIONAL GRID FOR A NUCLEAR REACTOR FUEL ASSEMBLY, AND ASSEMBLY COMPRISING AN APPLICATION THEREOF

[75] Inventors: Jean-Noël Canat, Lyons; Régis Mortgat, Couzon au Mont d'Or, both of France

[73] Assignees: Framatome, Courbevoie; Compagnie Generale des Matieres Nucleaires, Velizy Villacoublay, both of France

[21] Appl. No.: 735,251

[22] Filed: Jul. 24, 1991

[30] Foreign Application Priority Data

Jul. 24, 1990 [FR] France ................... 90 09447

[51] Int. Cl.$^5$ .................................. G21C 3/34
[52] U.S. Cl. ........................ 376/439; 376/438; 376/462; 376/443
[58] Field of Search ............... 376/439, 443, 442, 462, 376/454, 438; 976/DIG. 79, DIG. 80, DIG. 75; 148/11.5 R, 12.7 N

[56] References Cited

U.S. PATENT DOCUMENTS

| | | | |
|---|---|---|---|
| 4,155,807 | 5/1979 | Schreiber et al. | 376/438 |
| 4,576,786 | 3/1986 | DeMario | 376/439 |
| 4,692,302 | 9/1987 | DeMario et al. | 376/439 |
| 4,698,204 | 10/1987 | Taleyarkhan | 376/439 |
| 4,792,428 | 12/1988 | Canat et al. | 376/440 |
| 4,804,516 | 2/1989 | Thomazet et al. | 376/439 |
| 4,827,063 | 5/1989 | Bokers et al. | 376/439 |
| 4,844,861 | 7/1989 | LeClercq | 376/439 |
| 4,951,299 | 8/1990 | Patterson et al. | 376/439 |
| 5,080,727 | 1/1992 | Aihara et al. | 148/11.5 R |

FOREIGN PATENT DOCUMENTS

| | | |
|---|---|---|
| 0148452 | 12/1984 | European Pat. Off. . |
| 0262997 | 4/1988 | European Pat. Off. . |
| 0304724 | 3/1989 | European Pat. Off. . |
| 2457544 | 12/1989 | France . |

Primary Examiner—Donald P. Walsh
Assistant Examiner—Meena Cheliah
Attorney, Agent, or Firm—Pollock, Vande Sande & Priddy

[57] ABSTRACT

The additional mixing grid has no belt and comprises at least two sets of crossed plates that are fixed to each other at their cross-points, the plates being fitted with fins for stirring the coolant, and delimiting cells, some for receiving guide tubes and the others for receiving fuel rods. Each plate is provided, on each of the faces of those internal cells that receive the rods, with bosses that project sufficiently little to leave radial clearance for the rods passing through the cells and the projection of the bosses is proportioned relative to the projection of the fins so that in the event of bending vibration the rods come into contact with the bosses without reaching the fins, the lengths of the plates being such that the footprint of the additional grid is less than the footprint of the polygon constituting the virtual envelope of the rods.

11 Claims, 6 Drawing Sheets

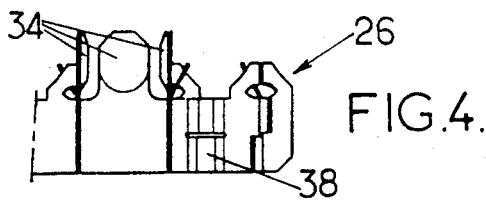
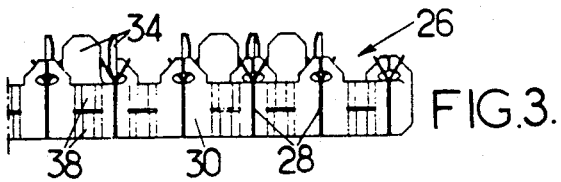
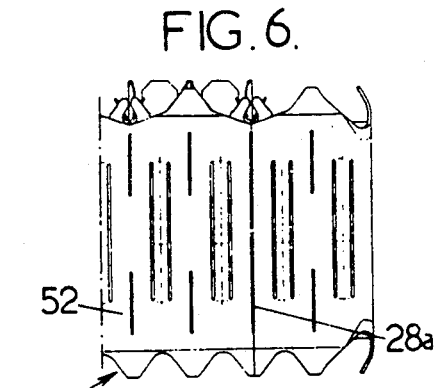
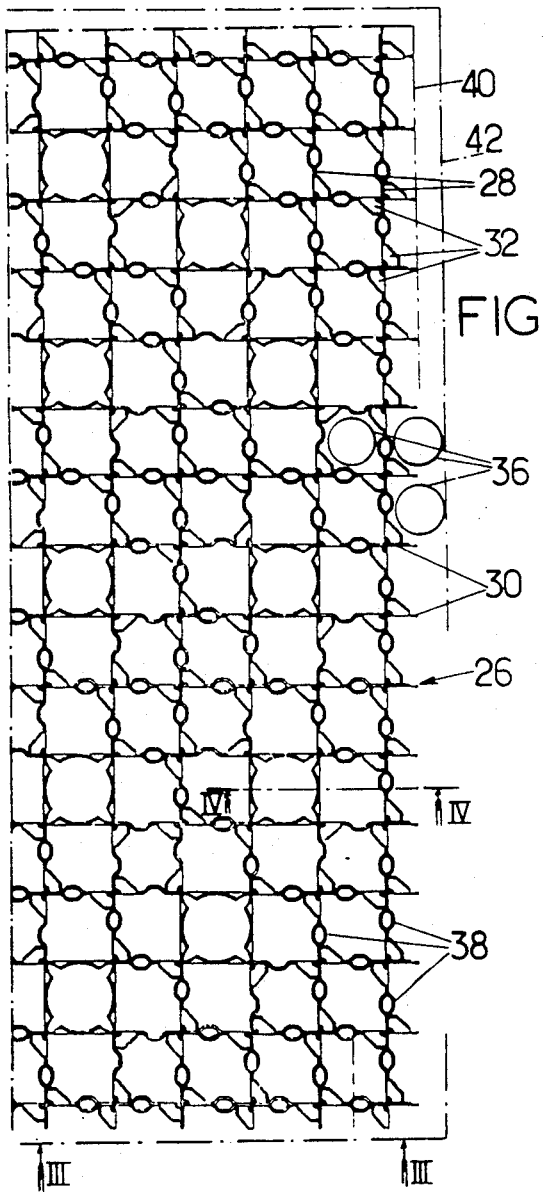
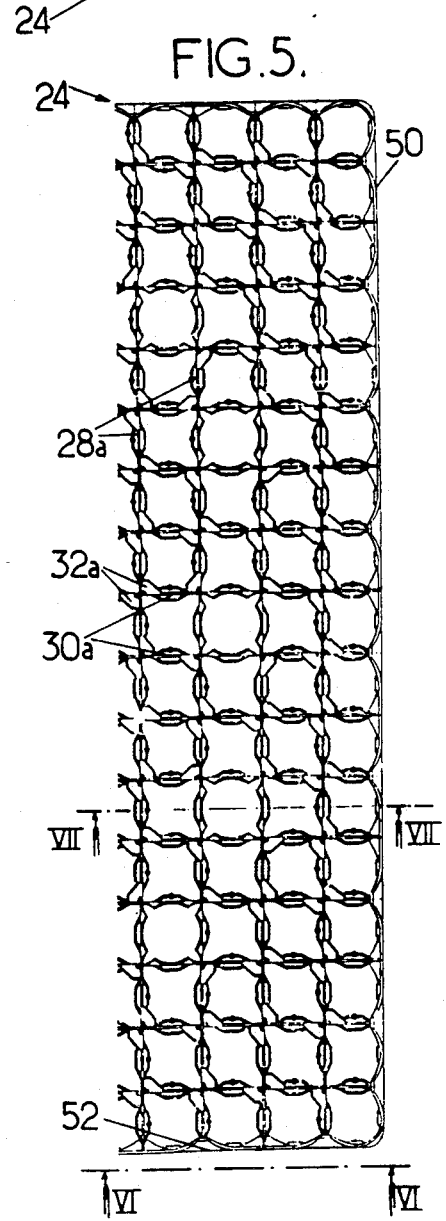

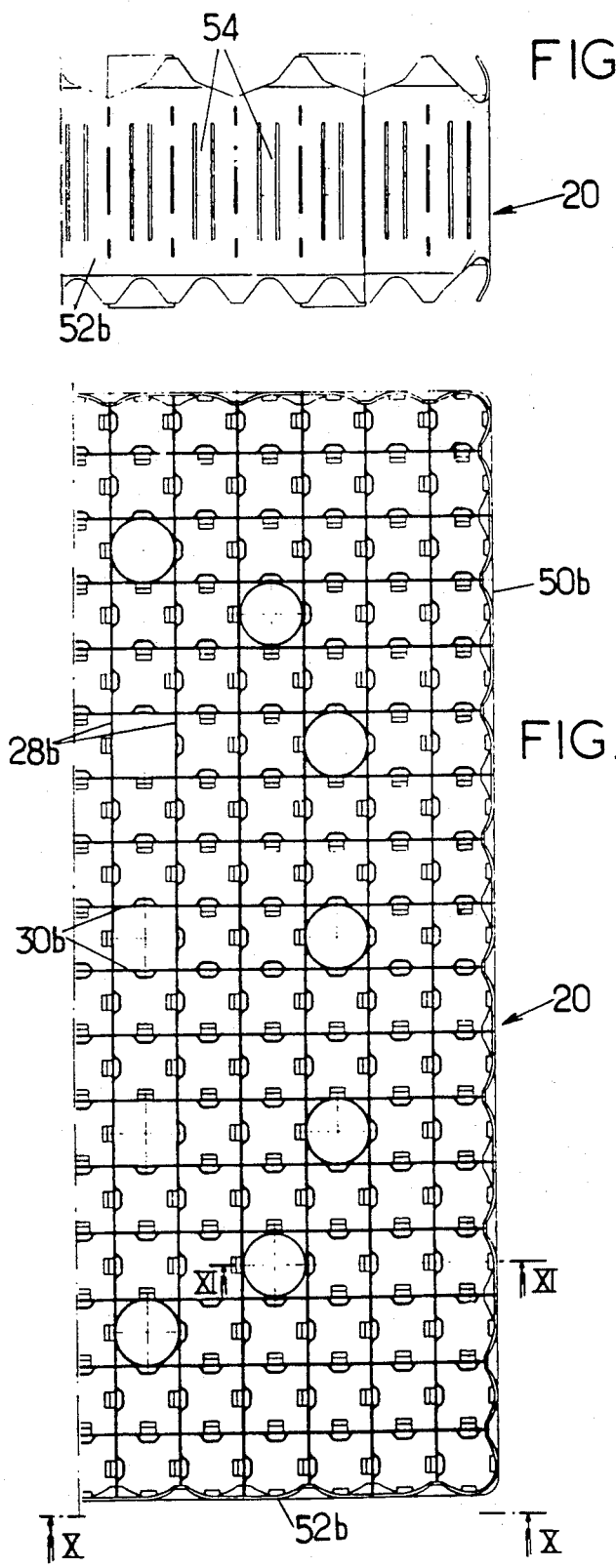
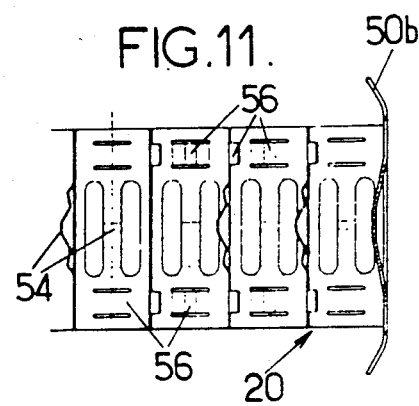

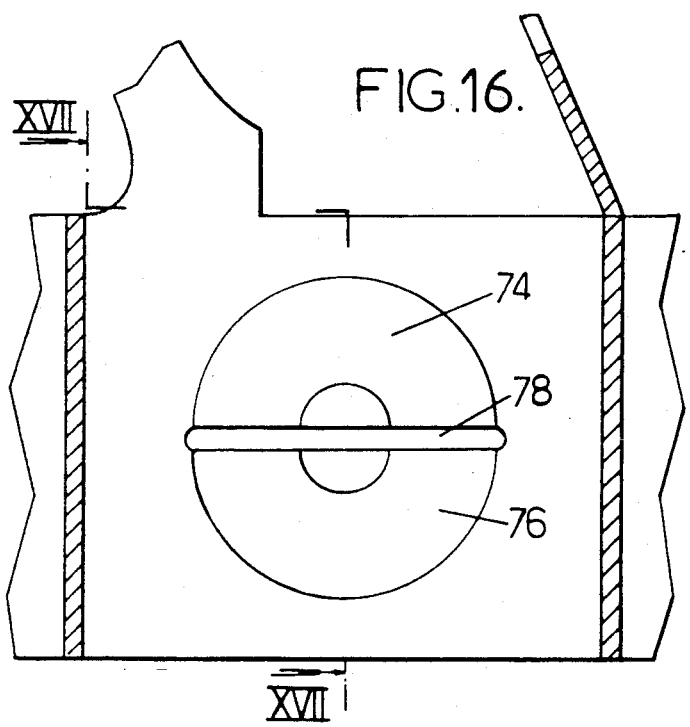
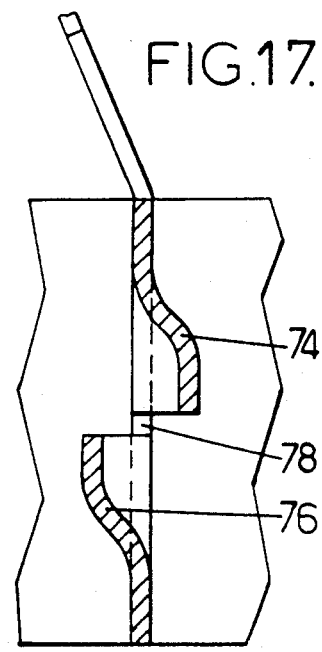
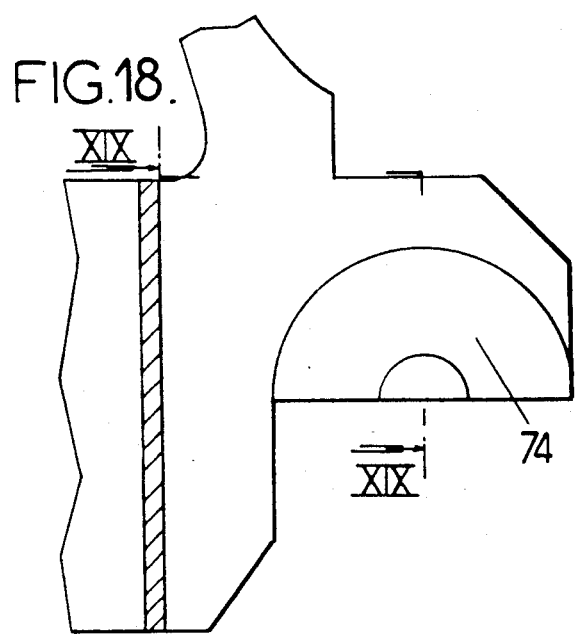
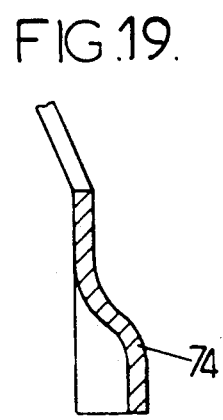

ADDITIONAL GRID FOR A NUCLEAR REACTOR FUEL ASSEMBLY, AND ASSEMBLY COMPRISING AN APPLICATION THEREOF

The present invention relates to an additional mixing grid for a nuclear fuel assembly, with the grid having the particular function of improving the mixing of the streams of coolant flowing upwards through the assembly, and of making temperatures more uniform, and it is designed to be interposed between grids that constitute structural parts of the assembly.

BACKGROUND OF THE INVENTION

The invention is particularly suitable for use in fuel assemblies for pressurized water reactors comprising a support structure having two end fittings interconnected by guide tubes and having structural grids distributed along the assembly, with each structural grid having at least two mutually crossed sets of crossed plates and outer belt delimiting cells, some for receiving the guide tubes and the others for receiving fuel rods, the plates being provided with means for limiting the clearance for the rods about the nodes of a regular array and being fixed to at least some of the guide tubes, at least some of the grids (those placed downstream in the flow direction) being provided with mixing fins for mixing the streams of coolant.

At least one of the structural grids also serves to support the rods. To this end, it is usually provided with springs that may be cut out in the plates or added thereto, serving to urge the rods against bosses stamped in the plates forming the other faces of each cell.

Often, support is provided by the top or the bottom structural grid. The other structural grids do not participate in providing support, i.e., they provide practically no contribution to holding the rods vertically. However, some of them at least often have the function of holding the rods in a plane, i.e., centering them accurately. To this end, each face of each rod-receiving cell in a structural grid carries a boss for bearing against the rod. The bosses project by such an amount that the rod has a sliding fit in the cell.

To increase heat exchange between the rods and the coolant and to make temperatures more uniform at each level, it has already been proposed to insert an additional mixing grid in one or more of the gaps between pairs of structural grids.

In particular, proposals have been made to use light-weight mixing grids provided with fins and having respective belts, and to place these grids between the conventional structural grids in the top portion of the assembly (when the coolant flows through the core upwards, as is generally the case).

However, because two additional grids of two adjacent fuel assemblies may strike or rub against each other, the belt must be strong. To make it strong, it is made up of outer plates that are thicker and/or higher than the internal plates, thereby increasing neutron absorption and headloss.

An attempt has been made to solve this problem (see U.S. Pat. No. 4,827,063) by using additional grids without belts, constituted by plates that are entirely flat and fixed to the guide tubes to delimit cells of a size such as to enable the rods to pass through them with clearance.

Such additional grids suffer from drawbacks. They place practically no limits on the clearance available for rods which may be subject to bending vibration, particularly in reactors whose thermal power is increased by increasing the flow rate and thus the flow velocity of the coolant. Such vibration leads to the coolant-stirring fins of the additional grid being hammered.

SUMMARY OF THE INVENTION

The present invention seeks in particular to provide an additional grid that satisfies practical requirements better than prior art additional grids, and in particular that improves heat exchange without suffering from the drawbacks of prior additional grids, whether or not they are fitted with belts.

To this end, the present invention provides an additional grid having no belt and comprising at least two sets of crossed plates that are fixed to each other at their cross-points, the plates being fitted with fins for stirring the coolant (generally, by welding or brazing) and delimiting cells, some for receiving guide tubes and the others for receiving fuel rods. Each plate is provided, on each of the faces of those internal cells that receive the rods, with bosses that project sufficiently little to leave radial clearance for the rods passing through the cells, and the projection of the bosses is proportioned relative to the projection of the fins so that in the event of bending vibration the rods come into contact with the bosses without reaching the fins.

It is advantageous for the lengths of the plates to be such that the footprint of the additional grid is less than that of the polygon constituting the virtual envelope of the rods: this ensures that the plates of two adjacent assemblies cannot come into contact and thus avoids shock, with shock being possible only between structural grids of the assembly, which grids are provided with belts.

The additional grid or grids or the assembly are generally made of a zirconium-based alloy presenting low neutron absorption. This alloy may be the alloy known under the name "zircaloy 4", and it may be annealed. Alternatively, the alloy may be a zirconium-based alloy that is quenched, e.g., an alloy containing 1% niobium, 1% tin, and 0.5% iron (percentages by weight).

Since the additional mixing grids have a thermohydraulic function only, they may have an axial length which is much less than that of the structural grids. The outside length (including fins) may be 10 mm, for example, instead of 43 mm.

It can be seen that the additional grid of the invention has a structure that is light in weight, gives rise to little headloss in the flow, and yet, when provided with appropriately-sized fins, improves the temperature uniformity of the flow. Because of the rod-holding means contained therein, it avoids any risks of the fins being hammered in the event of vibration, and it reduces the amount of bending possible for the rods.

The invention also provides a fuel assembly whose structure includes end fittings, guide tubes interconnecting the end fittings, and structural grids having respective belts (with at least one of the structural grids supporting the rods), and at least one additional grid of the type defined above, and placed between two structural grids in the downstream portion of the assembly.

According to another aspect of the invention which can be implemented independently of the first, the rods are supported by one of the two end structural grids and that grid is made of martensitic steel. The supporting grid is fixed to at least some of the guide tubes or to one of the end fittings, and it is provided with resilient means for supporting and centering the rods, which means may be conventional. The other end grid may likewise be provided with resilient support means, while not being fixed to the guide tubes so as to allow for the differential expansions that take place between the rods and the guide tubes under irradiation. The other structural grids are fixed to at least some of the guide tubes and carry either rod-centering means or means that merely limit rod bending clearance.

BRIEF DESCRIPTION OF THE DRAWINGS

Embodiments of the invention will now be described by way of example with reference to the accompanying drawings, in which:

FIG. 2 is a schematic plan view of a fragment of a particular embodiment of an additional mixing grid of the invention;

FIG. 3 is a side view of the FIG. 2 grid, along line III—III;

FIG. 4 is a large scale section view on line IV—IV of FIG. 2;

FIG. 5 is similar to FIG. 2 and shows the structure of a grid suitable for use in the assembly of FIG. 1 to limit rod clearance;

FIG. 6 is a side view of the FIG. 5 grid, seen in the direction of line VI—VI;

FIG. 9 is a view similar to FIG. 2, showing one possible way of making a support grid suitable for use in the assembly of FIG. 1;

FIG. 10 is a side view of the FIG. 9 grid, seen in the direction of line X—X;

FIG. 11 is a large scale detail view in section on line XI—XI of FIG. 9;

DETAILED DESCRIPTION

Figure 1:
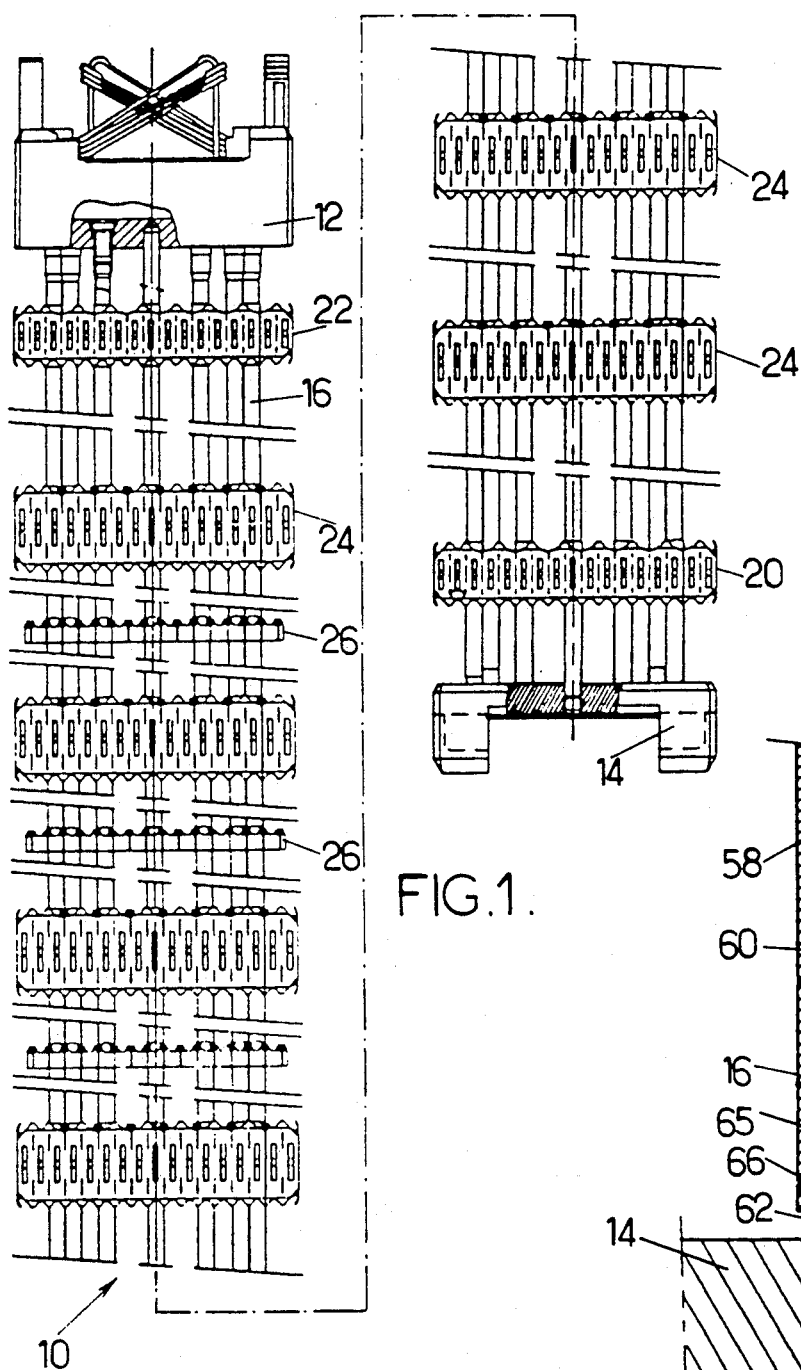
FIG. 1 is a schematic elevation view showing how grids are distributed in a fuel assembly implementing the invention and for use in a pressurized water reactor.

A grid of the invention is used, in particular, in a fuel assembly 10 of the kind shown in FIG. 1. This assembly 10 comprises a structure having two end fittings or endpieces 12 and 14 interconnected by guide tubes 16 for receiving the rods of a control cluster (not shown) and having structural grids spaced apart at intervals along the guide tubes and fixed to at least some of the guide tubes 16 (except for one of the end structural grids in the embodiment shown by way of example, which is not fixed to guide tubes). The grids delimit cells through which the full rods (not shown) pass, or through which the guide tubes pass.

The invention is described below essentially in its application to a fuel assembly in which the structural grids delimit square cells and in which the top end fitting 12 is fixed to the bottom end fitting 14 by the guide tubes of the assembly.

There are two different types of structural grid in the assembly shown by way of example.

The bottom structural grid 20 (FIGS. 9–11) is designed to support the fuel rods, being fixed to them by friction, and to hold the bottom ends of said rods in unvarying positions relative to the guide tubes 16 and to the bottom end fitting 14.

The top structural grid 22 is likewise fixed to the rods by friction, at the top end portions thereof, but it is free to move longitudinally relative to the guide tube 16 on which it slides.

The intermediate structural grids 24 (of which there are six in this example) may be constituted in various different ways. They may be conventionally constituted, being designed to center the rods accurately on the nodes of a regular array, which implies that they have means through which the rods can slide as a sliding fit; they may also be designed merely to limit the bending clearance available for the rods.

Various possible structures for the grids 20, 22, and 24 are described below by way of example.

The assembly of the invention shown in FIG. 1 also includes additional grids 26 for mixing the streams of coolant and for making temperature more uniform, i.e., grids that have a thermohydraulic function only. These grids are generally placed solely in the hottest portions of the assembly, i.e., between the downstream structural grids. The assembly shown in FIG. 1 has three mixing grids 26, none of which has a belt and all of which perform a thermohydraulic function only, each mixing grid being placed in a gap between two structural grids 24.

The three mixing grids are identical and may have the structure shown in FIGS. 2 to 4. They are made up of two sets of crossed plates 28 and 30 made of a zirconium-based alloy, such as annealed "zircaloy 4", or a Zr-based alloy that has better expansion and corrosion performance under irradiation when quenched (e.g., Nb 1%, Sn 1%, Fe 0.5%). The plates are cut from foil that is thin, e.g., about 0.5 mm thick, and assembled to a half-depth and fixed together by welding. Their downstream edges are extended by mixing fins 32, which may have any of the dispositions conventionally used. Around cells for receiving guide tubes 16, they are extended by tongues 34 designed to be welded to the guide tubes, e.g., by resistance welding.

To prevent the fuel rods 36 from coming into contact with the mixing fins 32 (only a few fuel rods are shown in FIG. 2), abutment bosses 38 are provided on the plates 28 and 30 and project into each of the cells occupied by a fuel rod 36. They project relative to the remainder of the plate by an amount small enough to leave diametrical clearance enabling the fuel rods 36 to slide freely. The bosses 38 may be aligned on a line that is offset relative to the middle of the cell face so as to avoid interfering with the roots of the mixing fins 32. They may then be provided along the entire width of the plate, two adjacent bosses being formed by making a slot along a midline of the plate and by deforming the plate in opposite directions above and below the slot.

The grid 26 shown in FIGS. 2 to 4 is made up of plates of such a length that the footprint of the grid represented by the dot-dashed outline 40 is inscribed within a square 42 which constitutes the virtual envelope of the rods 36. This prevents the additional grids in two adjacent assemblies from coming into contact with one another. There is therefore no need to give them the strength that would be required if there were any risk of shock.

In practice, it suffices merely for the plates to terminate level with the centers of the outermost fuel rods 36.

The structural grids 24 that do not support the rods may have the structure shown diagrammatically in FIGS. 5 to 8. Fins are provided on all of the grids 24 shown in FIG. 1, but in some cases the fins may be omitted from the grids that are placed furthest upstream.

The grids 24 are made up of two sets of plates 28a and 30a which are generally made of the same material as the plates 28 and 30.

The grids 24 as shown include mixing fins 32 which may likewise have the same disposition as the fins on the additional grids 24, and they also have bosses.

In the embodiment shown in FIGS. 5 to 8, there are six bosses for each cell that is to receive a fuel rod 36. Two of the bosses 44 and 46 are resilient and designed to bear against the rod. The other bosses 48 constitute mere bearing surfaces opposite to the resilient bosses.

The structural grids include respective belts formed by outer plates 50 and 52 whose corners are advantageously rounded to avoid catching on the belts of adjacent assemblies. The plates constituting a belt may be welded by fillets to the internal plates 28a and 30a. The internal plates may themselves be welded by laser beams or by electron bombardment at each cross-point in zones close to the large faces of the grid.

Figure 7:
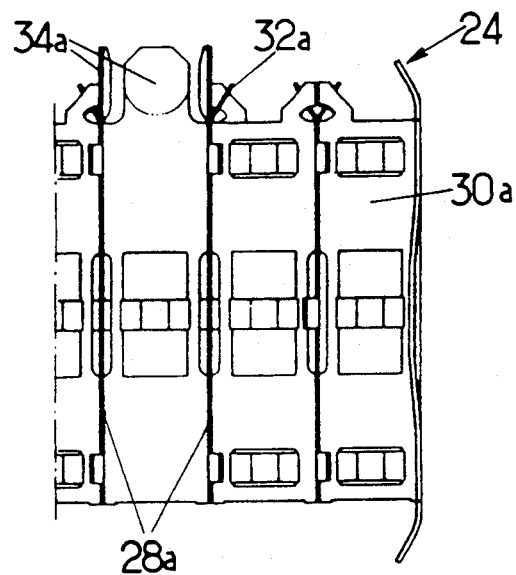
FIG. 7 is a large scale section view on line VII—VII of FIG. 5.
Figure 8:
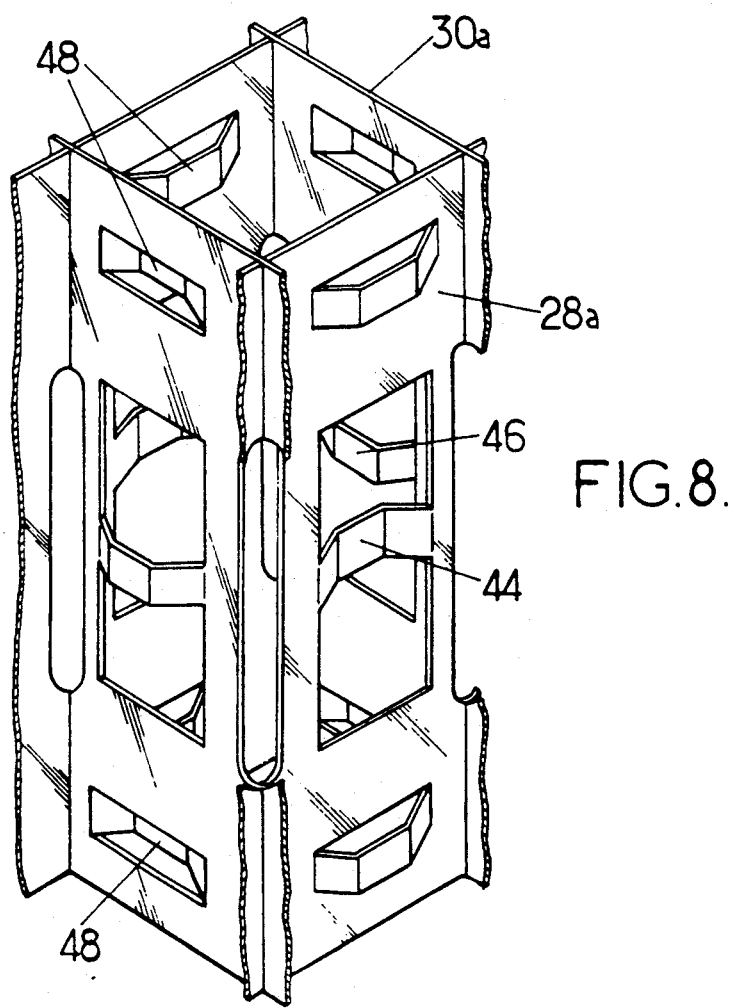
FIG. 8 is a large scale detail view in perspective, showing the walls of one of the cells in the FIG. 5 grid.

FIG. 7 shows tongues 34a that enable the grids 24 to be welded to the guide tubes.

In a modified embodiment, the bosses fitted to the grids 24 serve only to limit bending of the rods and prevent them from coming into contact with the fins in the event of the rods vibrating.

For example, these bosses may have the structure described in applicant's U.S. patent application Ser. No. 07/735,246 for "Mixing fin grid for a nuclear fuel assembly".

FIGS. 16 and 17 show an example of bosses. The bosses in a portion of plate which separates two cells are constituted by two portions 74 and 76 shaped like half-buttons, having a base that is approximately semicircular, aligned in the coolant flow direction and projecting in opposite directions. The bosses constitute scoops of the same size.

They are disposed head-to-tail and their open ends face each other. They are separated by a slot 78.

Rather than being orthogonal to the direction of flow, slot 78 may be slanted; then the scoops are also aligned in a direction at an angle with the direction of flow.

The invention is also applicable to grids having a thermohydraulic stirring function only, devoid of belt. Under such circumstances, the outermost cells may be provided with boss means in the form of a fraction of a scoop only.

FIGS. 18 and 19 show one possible embodiment of boss means suitable for use on such a grid. The end portion of each plate situated beneath the upper scoop 74 is eliminated.

By way of example, it may be mentioned that the scoops may project about 1.1 mm to about 1.2 mm and have a base diameter of about 7 mm.

The supporting grid 20 which constitutes the bottom structural grid has the function of clamping the rods and holding the bottom ends of the rods relative to the guide tubes 16 and to the bottom end fitting 14.

In the past, the bottom grid of a fuel assembly has often been made of zirconium alloy plates without stirring fins and fitted with springs made of a material that retains its mechanical properties under irradiation, e.g., Inconel.

In an advantageous embodiment of the invention, the grid 20 is made of plates of martensitic steel that are cut out, stamped and assembled together by brazing, and are then subjected to heat treatment imparting the necessary resilience to the springs integrated in the plates.

The following characteristics may be used, for example.

The plates are cut out from a foil of austenitic steel comprising about 80% by weight iron, and including 13% to 14% Cr, 4% to 8% Ni, and 2% to 3% Cu or Mo, and 0.1% to 0.5% Al, the content of other possible elements being less than 0.1%.

Before the plates are stamped, the ductility of the steel is increasd by quenching, followed by stress release at about 760° C., then at about 620° C. to reduce relaxation under irradiation.

After being cut out and stamped to form springs and bosses, the plates are assembled and then brazed in a conventional manner at about 930° C. To correct the thermal effects of brazing, the grid is subjected to quenching and to stress relaxation, e.g., by heating to about 930° C. and cooling in air, followed by being maintained for at least four hours in the range 570° C. to 600° C.

This provides a final microstructure that gives the steel good resistance to relaxation under irradiation together with favorable characteristics for resistiing both corrosion under stress and hydrogen embrittlement.

The plates are cut in such a manner that each cell containing a fuel rod is provided with two springs 54 disposed at 90° to each other, and our bosses 56 facing the springs 54 in pairs.

Figure 12:
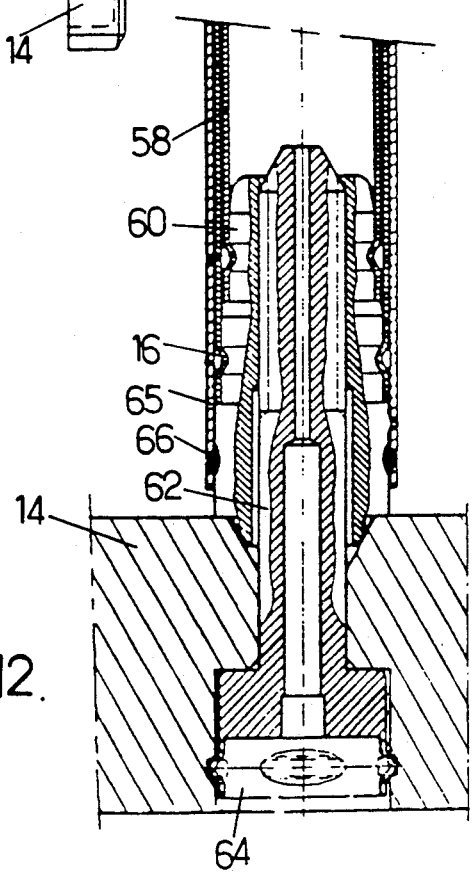
FIG. 12 is a large scale section view on the axis of a guide tube showing one possible way of making the connection means between the bottom portion of the guide tube, the bottom support grid, and the bottom end fitting.

When the grid 20 is made of martensitic steel, it may be connected directly to the guide tubes 16 by welding or brazing. The bottom portions of the guide tubes may be fixed to the bottom end fitting 14 and to the supporting grid 20 in the manner shown in FIG. 12. A tubular cartridge 58 is inserted in the bottom end portion of each of the twenty-four guide tubes 16, the cartridge being designed to provide hydraulic damping for falling rods in the control clusters. The cartridge 58 and the tube 16 are fixed together by spinning or rolling in the grooves of a guide tube plug 60, and the plug is itself fixed to the end fitting 14 by a screw 62 pierced by a coolant-passing hole and prevented from rotating by deformation of an end collar 64. The bottom grid 20 is provided with steel sleeves that are brazed thereto. The bottom ends of the sleeves 64 are resistance welded at 66 on the plugs 62.

The top grid 22 may also be made up of martensitic steel plates having springs and bosses of the kind shown in FIGS. 10 and 11. Sleeves may be brazed to the grid and held captive between two sets of abutments welded to the guide tubes above and below the grid 22 to delimit possible displacement of the grid relative to the guide tubes.

By way of example, it may be mentioned that an assembly for a pressurized water reactor of the kind shown in FIG. 1 may include three additional grids whose plates are cut out from a foil having a thickness of about 0.5 mm in general and having a height of 10 mm, with the structural grids 24 being made by stamping a 0.5 mm thick foil for its internal plates and a thicker foil for the plates constituting its belt, and having a height exceeding 40 mm. The height of the martensitic steel support grid may be 30 mm to 35 mm.

Figure 13:
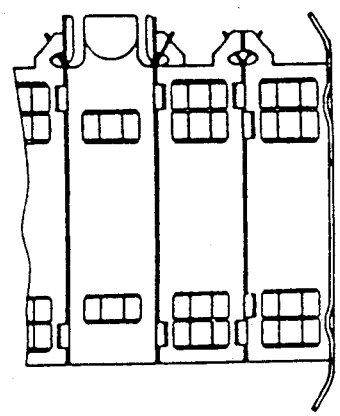
FIG. 13 is a view similar to FIG. 7, showing a variant embodiment of a structural grid.

The variant embodiment of the structural grid shown in FIG. 13 differs from that of FIGS. 5 to 8 in that each cell for receiving a rod is provided with eight bearing surface bosses made by cutting out and indenting the plates, thereby limiting the transverse clearance for the rods to prevent them from hammering the fins and from vibrating with an amplitude that could damage them. In the example shown in FIG. 13, the bosses are disposed in pairs, with the bosses in the same pair facing in opposite directions.

Figure 14:
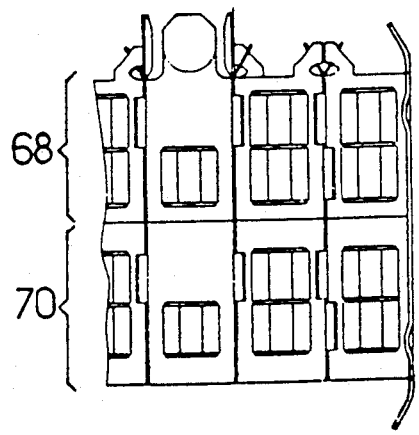
FIG. 14 is a view similar to FIG. 7, showing one possible way of making a structural grid from two halves that are fixed together.
Figure 15:
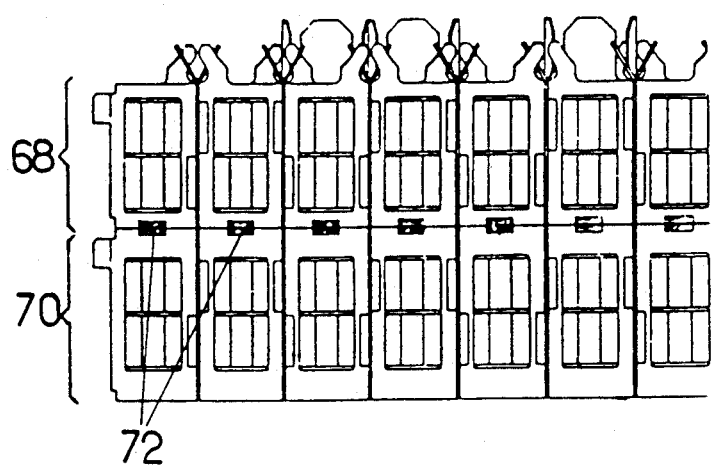
FIG. 15 shows a fragment of a grid corresponding to the variant embodiment of FIG. 14, prior to the belt being installed.

In the variant embodiment shown in FIGS. 14 and 15, the belt 24 is made up of two halves 68 and 70 that are identical except that the top half is provided with fins and with tongues for fixing to the guide tubes. Each of the cells for receiving a fuel rod include eight bosses, as shown in FIG. 13. Each of the halves has no belt. These two halves are initially fixed together by welding the two halves at their peripheries, i.e., at sixty-eight locations. The terminal tongues of the internal plates are then engaged in plates that are twice the height of the half-plates, and that are designed to constitute the belt. Finally, the outer plates are welded in a conventional manner.

What is claimed is:

1. Coolant mixing grid for a nuclear fuel assembly for location between grids constituting structural parts of said fuel assembly, said mixing grid being devoid of a belt and comprising at least two crossed sets of mutually parallel plates fixed to each other at cross-points of said plates, said plates being provided with coolant stirring fins and defining cells, some of said cells receiving guide tubes and others of said cells receiving fuel rods, each of said plates being provided, on each of faces of each of said cells receiving fuel rods, with bosses projecting radially inwardly into a said cell by an amount which is sufficiently small to leave radial clearance for a respective fuel rod passing through said cell, and an amount of projection of said bosses being proportioned relative to projection of said fins, so that in case of bending vibration the respective rod comes into contact with said bosses without reaching said fins, lengths of individual said plates being such that a footprint of said grid is less than a polygon constituting a virtual envelope of said rods.

2. A grid according to claim 1, made of a zirconium-based alloy having low neutron absorption.

3. A fuel assembly comprising:
   (a) a support structure having two end fittings;
   (b) guide tubes interconnecting said end fittings;
   (c) structural grids distributed along said fuel assembly, each structural grid having at least two mutually crossed sets of parallel plates and an outer belt defining cells, some of said cells receiving said guide tubes and others of said cells receiving fuel rods, said plates being provided with means for limiting movment of said fuel rods relative to nodes in a regular array, and being fixed to at least some of said guide tubes, at least some of said structural grids being provided with fins for mixing streams of coolant;
   (d) at least one coolant mixing grid placed between two structural grids in a downstream portion of said fuel assembly, said coolant mixing grid being devoid of a belt and comprising at least two crossed sets of mutually parallel plates fixed to each other at cross-points of said plates, said plates being provided with coolant stirring fins and defining cells, some of said cells receiving said guide tubes and others of said cells receiving fuel rods; and
   (e) each of said plates being provided, on each of faces of each of said cells receiving fuel rods, with bosses that project radially inwardly into said cell by an amount which is sufficiently small to leave radial clearance for a respective rod passing through said cell, an amount of projection of said bosses being proportioned relative to a projection of said fins so that in case of bending vibration, the respective rod comes into contact with said bosses without reaching said fins, lengths of individual plates being such that a footprint of said grid is less than a polygon constituting a virtual envelope of said rods.

4. An assembly according to claim 3, wherein said fuel rods are only supported by at least one of terminal ones of said structural grids which are fixed to at least some of said guide tubes and which are provided with resilient means for supporting and centering said rods at nodes of said array.

5. An array according to claim 4, wherein the other terminal grid is also provided with resilient support means, but is unconnected to said guide tubes.

6. An assembly according to claim 4, wherein said structural grids other than said terminal grids are fixed to at least some of said guide tubes and carry either rod-centering means or means for limiting bending movement available to said fuel rods.

7. An assembly according to claim 4, wherein at least one of said structural grids which supports said fuel rods is of martensitic steel while said coolant mixing grid is of zirconium alloy.

8. An assembly according to claim 7, wherein said structural grid which supports said rods is provided with steel sleeves brazed thereto and having bottom ends welded on guide tube plugs.

9. An assembly according to claim 7, wherein said grid which supports said rods is made of martensitic steel containing 13% to 14% by weight of nickel, and subjected to quenching at about 930° C. and to annealing in the range 570° C. to 600° C.

10. An assembly according to claim 5, wherein said other terminal grid is made of martensitic steel, is provided with resilient rod-centering means, and is free to move along said guide tubes over a predetermined range.

11. An assembly according to claim 10, wherein said other grid is provided with brazed sleeves held captive between abutments welded to said guide tubes.

* * * * *